(12) United States Patent
Van Caenegem et al.

(10) Patent No.: US 8,180,220 B2
(45) Date of Patent: May 15, 2012

(54) PROTOCOL CONFIGURATION METHOD

(75) Inventors: Tom Van Caenegem, Schelderode (BE); Edwin Augustus Philomena Ringoot, Jansteen (NL)

(73) Assignee: Alcatel Lucent, Paris (FR)

( * ) Notice: Subject to any disclaimer, the term of this patent is extended or adjusted under 35 U.S.C. 154(b) by 973 days.

(21) Appl. No.: 11/298,637

(22) Filed: Dec. 12, 2005

(65) Prior Publication Data
US 2006/0153222 A1   Jul. 13, 2006

(30) Foreign Application Priority Data

Dec. 13, 2004   (EP) .................................... 04292979

(51) Int. Cl.
*H04J 14/00*   (2006.01)

(52) U.S. Cl. ................ 398/66; 398/69; 398/70; 398/71; 398/72

(58) Field of Classification Search ................ 398/70, 398/71, 66, 69, 72; 370/445, 441
See application file for complete search history.

(56) References Cited

U.S. PATENT DOCUMENTS

| | | | | |
|---|---|---|---|---|
| 5,987,061 A * | 11/1999 | Chen | | 375/222 |
| 6,373,854 B1 * | 4/2002 | Lee | | 370/466 |
| 6,393,032 B1 * | 5/2002 | Ikegami | | 370/447 |
| 6,937,614 B1 * | 8/2005 | Roberts et al. | | 370/465 |
| 6,980,519 B1 * | 12/2005 | Horn et al. | | 370/235 |
| 7,031,343 B1 * | 4/2006 | Kuo et al. | | 370/473 |
| 7,076,177 B1 * | 7/2006 | Yang et al. | | 398/208 |
| 7,277,648 B2 * | 10/2007 | Lanne et al. | | 398/198 |
| 7,593,418 B1 * | 9/2009 | Benhaim et al. | | 370/432 |
| 7,609,967 B2 * | 10/2009 | Hochbaum et al. | | 398/67 |
| 7,630,639 B2 * | 12/2009 | Kramer et al. | | 398/72 |
| 7,643,753 B2 * | 1/2010 | Weitz et al. | | 398/67 |
| 7,653,312 B2 * | 1/2010 | Mori | | 398/100 |
| 7,917,032 B2 * | 3/2011 | Mori | | 398/72 |
| 7,920,791 B2 * | 4/2011 | Sakai et al. | | 398/66 |
| 7,941,055 B2 * | 5/2011 | Huang et al. | | 398/158 |
| 2003/0091045 A1 * | 5/2003 | Choi et al. | | 370/390 |
| 2003/0231586 A1 * | 12/2003 | Chheda | | 370/230 |

(Continued)

OTHER PUBLICATIONS

Motoyuki Nakamura et al, "Proposal of Networking by PON Technologies for Full and Ethernet Services in FTTx", Journal of Lightwave Technology, 'Online! vol. 22, No. 11, Nov. 2004, pp. 2631-2640—XP002331882.

(Continued)

*Primary Examiner* — Kenneth N Vanderpuye
*Assistant Examiner* — Hibret Woldekidan
(74) *Attorney, Agent, or Firm* — Sughrue Mion, PLLC

(57) ABSTRACT

A protocol configuration method for use by a substation to be coupled to a main station in an optical access network is described. The configuration method comprises the following steps:
predefining for the substation a plurality of predefined types of protocol for use by the substation of one of the types of protocol during operation; and
after being coupled to the main station, determining with a first determiner, a bit-rate and a line-coding for a bit-stream being received from the main station, thereby providing a downstream line-rate and a downstream line-coding; and
based upon at least anyone of the downstream line-rate, the downstream line-coding and the bit-stream, selecting with a selector according to predefined rules and conditions a type out of the plurality of predefined types of protocol for the bit-stream, the predefined rules and condition are based upon one or more distinguishing marks between the plurality of predefined types of protocol; and
activating the selected type for further operation and thereby enabling the substation to communicate with the main station according to the selected type of protocol.

15 Claims, 1 Drawing Sheet

U.S. PATENT DOCUMENTS

| | | | |
|---|---|---|---|
| 2004/0109688 A1* | 6/2004 | Kim et al. | 398/68 |
| 2004/0141759 A1* | 7/2004 | Stiscia et al. | 398/168 |
| 2004/0264961 A1* | 12/2004 | Nam et al. | 398/58 |
| 2005/0175344 A1* | 8/2005 | Huang et al. | 398/79 |
| 2005/0183131 A1* | 8/2005 | Lee et al. | 725/111 |
| 2005/0286903 A1* | 12/2005 | Jennen et al. | 398/140 |
| 2006/0133809 A1* | 6/2006 | Chow et al. | 398/66 |

OTHER PUBLICATIONS

ITU-T Study Group 15: "Broadband optical access systems based on Passive Optical Networks (OPON)", ITU-T Recommendation G.983.1, Online! Oct. 19998, pp. 1-100, XP02331883.

ITU-T Study Group 15, "Broadband optical access systems based on Passive Optical Networks (PON) Amendment 2", ITU-T Recommendation G.983.1, 'Online!, Mar. 2003, pp. 1-9, XP002331884.

Y. Maeda, :"B-PON Standardization in Fasan", Optical Networks Magazine, SPIE, Bellingham, WA, US, vol. 3, No. 6, Nov. 2002, pp. 80-90, XP001161653.

F. J. Effenberger et al, "Advances in Broadband Passive Optical Networking Technologies", IEEE Communications Magazine, IEEE Service Center, Piscataway, NJ, US vol. 39, No. 12, Dec. 2001, pp. 188-124, XP001110511.

* cited by examiner

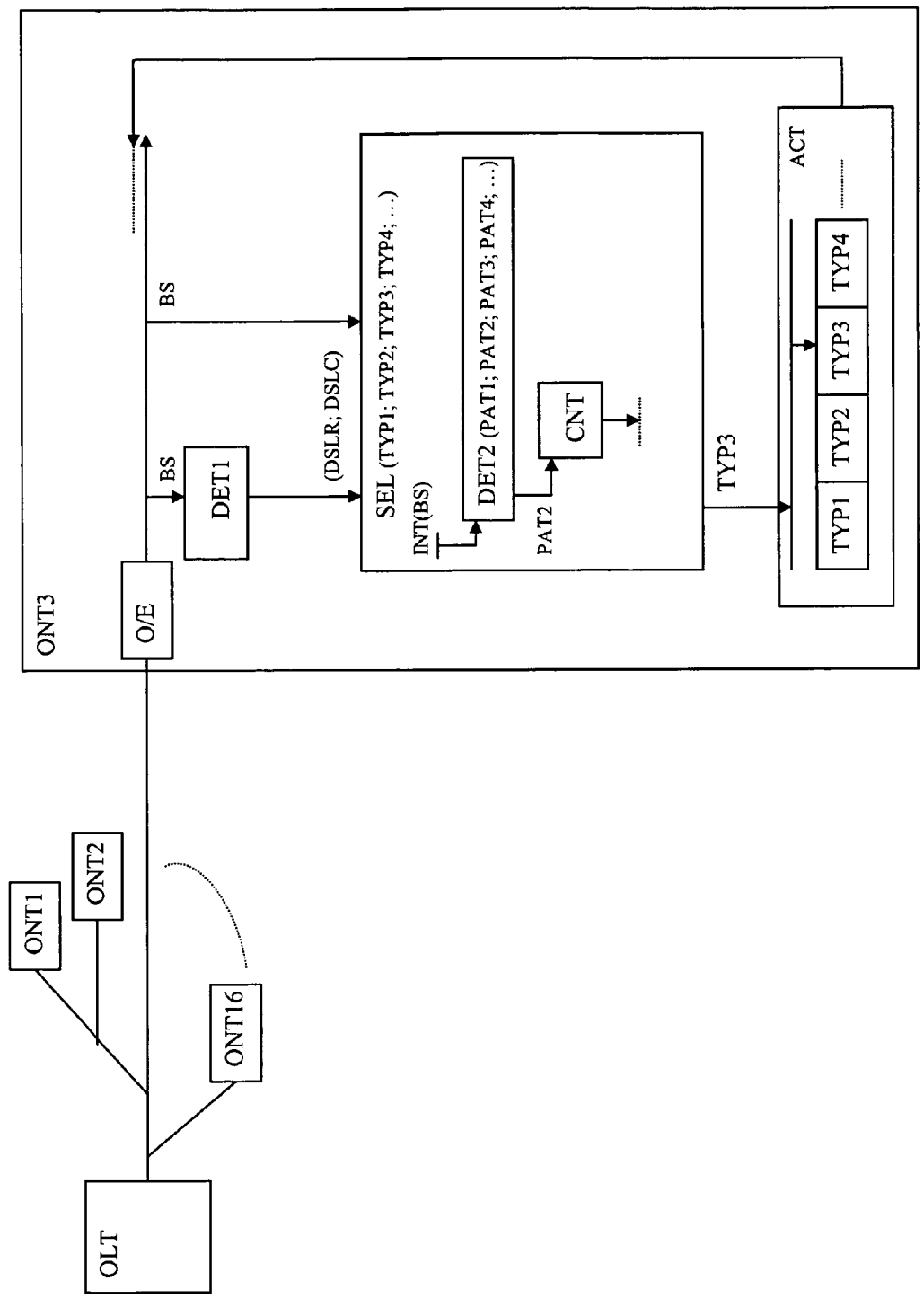

PROTOCOL CONFIGURATION METHOD

The present invention relates to a configuration method for use by an optical substation and such a substation.

Such a method and substation are known in access networks such as e.g. Passive Optical Networks, shortly called hereafter PON networks. Such PON networks are designed according to multiple existing PON standards such as e.g. BPON, GPON, EPON.

It is known that in such a PON system the Optical Line Terminator, hereafter also called the main station, is always the reference for the protocol to be used, as well on Physical Medium Dependent level i.e. PMD level, as on PON Transmission Convergence TC layer level i.e. TC level.

A typical Physical Medium Dependent Layer, shortly called PMD related characterization of a type of protocol during operation is the downstream and upstream bit-rate of the actual operative type of protocol. On the TC layer, a substation can be designed to terminate one single PON protocol e.g. the BPON protocol or it is designed to cope with multiple PON protocols such BPON, EPON, and GPON. This latter implementation comprises usually different chipsets whereof each chipset is enabled to function according to a protocol described in one of the different standards.

Thus, a known substation that is coupled to a main station in an optical access network is enabled to operate according to at least one of a plurality of predefined types of protocol TYP1; TYP2; TYP3; TYP4; .... Such a type of protocol can be anyone of the following non-exhaustive list:

BPON protocol with 155 Mbit/s. downstream line-rate and 155 Mbit/s. upstream line-rate; and BPON protocol with 622 Mbit/s. downstream line-rate and 155 Mbit/s. upstream line-rate; and BPON protocol with 622 Mbit/s. downstream line-rate and 622 Mbit/s. upstream line-rate; and BPON protocol with 1244 Mbit/s. downstream line-rate and 622 Mbit/s. upstream line-rate; and GPON protocol with 1244 Mbit/s. downstream line-rate and 155 Mbit/s. upstream line-rate; and GPON protocol with 1244 Mbit/s. downstream line-rate and 622 Mbit/s. upstream line-rate; and GPON protocol with 1244 Mbit/s. downstream line-rate and 1244 Mbit/s. upstream line-rate; and GPON protocol with 2488 Mbit/s. downstream line-rate and 155 Mbit/s. upstream line-rate; and GPON protocol with 2488 Mbit/s. downstream line-rate and 622 Mbit/s. upstream line-rate; and GPON protocol with 2488 Mbit/s. downstream line-rate and 1244 Mbit/s. upstream line-rate; and GPON protocol with 2488 Mbit/s. downstream line-rate and 2488 Mbit/s. upstream line-rate; and EPON protocol with 1250 Mbit/s downstream line-rate and 1250 Mbit/sec upstream line-rate.

In this way any predefined protocol in combination with any of its predefined downstream line-rates and any of its predefined upstream line-rates for operation mode can implement such a type of protocol.

When a new substation needs to be installed at a PON with an optical line terminator that functions according to a predefined type of protocol, one must take care that the new substation is designed to handle this predefined type of protocol. Furthermore, in the event when the substation is designed with the capability to function according to multiple types of protocols, care must be taken that at installation time, the right predefined type of protocol is selected and activated. A technician that installs the substation usually does this.

Furthermore, in the event when the operator decides to change or to upgrade its line terminator towards a use of a different type of protocol, all substation that are coupled to the network of this line terminator should be either replaced or, in the event of supporting different type of protocols, should be manually tuned towards this different setting i.e. towards this other type of protocol. This is usually done by a technician or upon directions of the operator, by the user itself.

An object of the present invention is to provide a configuration method for use by a substation and a substation of the above known type but wherein the substation is capable to automatically select the right predefined protocol that is used i.e. the protocol that is imposed by the line terminator to which the substation is coupled.

According to the invention, this object is achieved due to the fact that the substation and the method comprises a first determiner for determining, after being coupled to the main station, a bit-rate and a line-coding for a bit-stream being received from the main station, and to provide thereby a downstream line-rate and a downstream line-coding; and a selector for selecting, based upon at least anyone of the downstream line-rate, the downstream line-coding and the received bit-stream, and according to predefined rules and conditions a type out of the plurality of predefined types of protocol TYP1; TYP2; TYP3; TYP4; ... for the bit-stream, the predefined rules and condition are based upon one or more distinguishing marks between the plurality of predefined types of protocol TYP1; TYP2; TYP3; TYP4; ... ; and an activator for activating the selected type of protocol for the operation and to thereby enable the substation to communicate with the main station (OLT) according to the selected type of protocol.

This configuration method is described in claim 1 and is executed by the substation of claim 5.

It has to be remarked that this method and substation of the present application can be used in the event when a new substation is to be connected to an existing Passive Optical Network, but that they as well can be used in the event when the predefined protocol that is operative on the Passive Optical Network between the main station and the different substations is tuned from one to another. With such an implementation, every substation according to the present application that is coupled to the optical line terminator is enabled to execute again the steps of the method of the present application and to select thereby the newly type of protocol.

A possible implementation of the selecting step is that it comprises a recognizing step that is executed by means of a second determiner that recognizes within the bit-stream a predefined pattern out of a plurality of predefined patterns. This is described in claim 2 and claim 6.

A first example of an implementation of such a predefined pattern is e.g. a Physical Layer Operation and Maintenance cell, shortly called PLOAM cell. Indeed, in the event when the second determiner recognizes such a PLOAM cell in the received bit-stream, elimination in the plurality of types of protocol can be performed since only the BPON types of protocol comprise in its frame format a PLOAM cell.

A second example of an implementation of such a predefined pattern is e.g. with "a typical pattern that identifies a start of a frame". Indeed, by recognizing by means of such a second determiner within the bit-stream, and preferably within a PLOAM cell, a predefined pattern out of a plurality of predefined patterns that indicates "a start of a frame", the first PLOAM cell of a frame can be identified.

A third example of a pattern is provided by an "idle grant" of e.g. a BPON type of protocol. Such an idle grant comprises a typical bit-pattern that can be recognized by a determiner similar to said second determiner.

It has to be remarked that the recognition of e.g. a PLOAM cell, or the recognition of e.g. a "start of frame" or an "idle grant", can be executed by means of a same determiner or by means of different determiners that are working in parallel or in sequence.

It becomes clear that by implementing the recognition step of claim 2 according to different ways which are based upon one or more distinguishing marks between the plurality of predefined types of protocol, and by executing these different implementations, one after the other or in parallel according to a predefined sequence, i.e. according to predefined rules and conditions, an elimination upon the plurality of predefined types of protocol is realized.

As a consequence, a possible partial implementation of the selecting step is the selection of one of the BPON Types of protocol. The predefined rules and conditions based upon one or more distinguishing marks are hereby based on typical BPON protocol features. Indeed, one of the features which is typical for BPON is the fact that a PLOAM cell, with a typical predefined structure, is generated by the optical line terminator on a regular base and inserted in the downstream frame. Furthermore, it has to be explained that in each PLOAM cell of a downstream frame a number of grants are inserted at a predefined place of the PLOAM cell. Depending on the desired downstream and upstream line rate, a remaining part of the predetermined place for the grants in the PLOAM cells, is filled with idle grants. Such an idle grant is easy to be recognized by any optical line terminator because of its specific pattern. So, it becomes clear that the number of idle grants of the different PLOAM cells in one downstream frame is significant for the determination of the actual used upstream bit-rate of the PON network whereto the optical line terminator was coupled to This brings us to a following aspect of the present application that describes that the selector that executes the selecting step further comprises a counter that is coupled to such as second determiner to count a number of idle grants within such a predefined pattern. This is described in claim 3.

In order to realize a selection of a particular BPON type of protocol, the selection step can for example comprise the following sub-steps:
  recognizing, within the bit-stream a PLOAM cell by means of e.g. searching for a PLOAM cell header pattern; and locking on the train of PLOAM cells; and
  recognizing within a recognized PLOAM cell a pattern that indicates whether a recognized PLOAM cell is the 1st or not inside a frame;
  counting a number of "idle grants" within each PLOAM cell of one frame; and
  based on the number of "idle grants" within one frame, selecting the right type of BPON protocol with respect to the upstream and downstream line-rate i.e. the one that is predefined to be associated to the counted number of idle grants. Hereby the desired upstream line-rate is determined and the desired type of protocol is selected. This is described in claim 3 and claim 7.

In this way, after a first pre-selection among the plurality of predefined types of protocol of the set of different BPON types, also among these BPON types of protocols the one with this particular downstream and upstream bit-rate is selected and provided to the activator.

A further aspect of the present application is that described in claim 4. Herein it is described that the identifying step is merely based upon the downstream line-rate. Indeed, one of the distinguishing marks between the plurality of different types of protocol is the knowledge that among the actual known PON protocols, the Ethernet Protocol where for actual only one type of protocol is defined (one downstream line-rate combined with one upstream line-rate) is the only one that has a downstream line rate which is substantial equal to 1.25 Gigabit/s. In the event when the determined downstream line-rate is provided by the first determiner to the selector, and in the event when the value of this downstream line-rate is substantially matching with a predetermined line-rate of e.g. 1.25 Gigabit/s, no further interpretation of the bit-stream has to be provided in order to execute its selection out of the types of protocol. Indeed, the selector selects among the different types of protocol the only available type of protocol with a matching downstream line-rate of 1.25 Gigabit/s i.e. the EPON type of protocol. The method might further be implemented with a possible controlling step upon the line-coding i.e. in order to determine whether the determined and provided line-coding indeed matches with the known line-coding of the EPON type of protocol.

Finally it has to be noted that it is described in claim 8 that a substation according to the present invention of the optical access network is further adapted to form part of a passive optical network in a telecommunication system.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawing wherein FIG. 1 represents a passive optical network in a telecommunication system.

The passive optical network is an optical access network that is preferred here as an example to explain the basic idea of the present invention.

Referring to this FIG. 1, the passive optical network, called hereafter shortly PON network, is an optical access network with a tree-like structure. An optical line terminator OLT is coupled to a common branch of this PON network. Different optical network terminators are coupled to different individual branches of the PON network. Furthermore, FIG. 1 shows as a matter of an example 4 optical network terminators ONT1, ONT2, ONT3 and ONT16 i.e. substations that are each coupled to an individual branch of the PON network. In order not to complicate the FIG. 1, only for optical network terminator ONT3 the different functional blocks related to the main aspects of the present invention are shown.

The working of this substation ONT3, according to the present invention in accordance with its telecommunication environment that is shown in FIG. 1, will be explained by means of a functional description of the different blocks shown therein. Based on this description, the practical implementation of the blocks will be obvious to a person skilled in the art and will therefor not be described in details. In addition, the principle working of the configuration method will be described in further detail.

The optical network terminator ONT3 comprises an optical/electrical converter O/E being coupled to an input. The converter O/E is coupled to a first determiner DET1 that is coupled on its turn to a selector SEL. The selector SEL comprises among other functional bocks a second determiner DET2 and a counter CNT. The selector SEL is further coupled to an activator ACT.

It has to be explained that a prior art optical network terminator comprises optics, Physical Medium Dependent (PMD) drivers, Transmission Convergence TC chip and corresponding software and firmware and Gateway functionalities that enables the service delivery such as Ethernet service, POTS, ATM over the User Network Interfaces . . . .

A vendor may choose to have logic inside its optical network unit such that it supports multiple optical access protocols with corresponding differentiated optical access—optical unit driver firmware. A PON protocol includes the Transmission Convergence (TC) part as well as Physical Medium Dependent (PMD) part. On TC layer one can make a distinction between BPON, GPON and EPON and additional future PON TC protocols that might be standardized. The PMD aspects refers to the line rate in upstream and downstream direction, to the line coding, burst overhead, etc . . . .

Presume that the ONT3 is enabled to operate according to anyone of the hereafter listed types of protocol and that the types of protocol TYP1, TYP2, TYP3 and TYP4 which are shown in the FIG. 1 are equal to the referred ones as provided:

BPON protocol with 155 Mbit/s. downstream line-rate and 155 Mbit/sc. upstream line-rate; and
TYP1=BPON protocol with 622 Mbit/s. downstream line-rate and 155 Mbit/sc. upstream line-rate; and
TYP2=BPON protocol with 622 Mbit/s. downstream line-rate and 622 Mbit/s. upstream line-rate; and
BPON protocol with 1244 Mbit/s. downstream line-rate and 622 Mbit/s. upstream line-rate; and
BPON protocol with 1244 Mbit/sec. downstream line-rate and 155 Mbit/sec. upstream line-rate;
GPON protocol with 1244 Mbit/s. downstream line-rate and 155 Mbit/s. upstream line-rate; and
TYP3=GPON protocol with 1244 Mbit/s. downstream line-rate and 622 Mbit/s. upstream line-rate; and
GPON protocol with 1244 Mbit/s. downstream line-rate and 1244 Mbit/s. upstream line-rate; and
GPON protocol with 2488 Mbit/s. downstream line-rate and 622 Mbit/s. upstream line-rate; and
GPON protocol with 2488 Mbit/s. downstream line-rate and 1244 Mbit/s. upstream line-rate; and
GPON protocol with 2488 Mbit/s. downstream line-rate and 2488 Mbit/s. upstream line-rate; and
TYP4=EPON protocol with 1.25 Gigabit/sec. downstream line-rate and 1.25 upstream line-rate.

The present invention refers to the additional capability of an ONT e.g. ONT3 to automatically detect what protocol is used on the PON by the OLT. Such a capability may impact both the circuitry of PMD and the TC subparts of the ONT. This will now be described in further details.

Once the ONT3 is coupled to OLT, the optical/electrical converter converts the received optical signal into an electrical signal. It has to be remarked that, not only when the ONT3 is connected for the first time to the OLT but also when the OLT is changing is actual used type of protocol, the following described method is activated by the ONT3 to change its used type of protocol for operation and communication with the OLT. The electrical signal, called bit-stream, is forwarded to a first determiner DET1.

The ONT3 according to the present invention comprises the first determiner DET1 to determine, after being coupled to the main station OLT, a bit-rate and a line-coding for a bit-stream BS being received from the main station OLT, and to provide thereby a downstream line-rate DSLR and a downstream line-coding DSLC.

This downstream line-rate DSLR and a downstream line-coding DSLC is provided to the selector. The selector SEL selects, based upon at least anyone of the downstream line-rate, the downstream line-coding and the bit-stream BS, and according to predefined rules and conditions, a type e.g. TYP3 out of the plurality of predefined types of protocol (TYP1; TYP2; TYP3; TYP4; . . . ) for the bit-stream. The predefined rules and condition are based upon one or more distinguishing marks between the plurality of predefined types of protocol (TYP1; TYP2; TYP3; TYP4; . . . ). Once the type of protocol is determined the activator ACT activates the selected type of protocol e.g. TYP3 for the operation and enables thereby the substation ONT3 to communicate with the main station OLT according to the selected type of protocol TYP3.

Hereby it becomes clear that ONT3 being equipped with the self-detection capability, exercises the following tasks after start-up:

detecting autonomously the downstream bit-rate and line coding used by the OLT i.e. synchronization function; and selecting which type of protocol is used.

This might be unambiguously concluded from the outcome of the previous task, or the implemented logic is used that allows this task.

This means that the ONT3 tries to lock on/to get synchronized with a pattern or frame that is specific for TC layer of each of the protocols it supports. Once the protocol used by the OLT is detected and selected, the ONT can participate to the ranging procedure specific for the selected PON protocol.

The advantage of the present application is that a PON ONT vendor can focus on fabrication of one single PON ONT unit that supports e.g. BPON, GPON, and EPON at the same time i.e. that different types of protocol with different upstream and downstream line-rates are supported. The installation of such an ONT that can automatically detect the protocol of the OLT, is plug and play, which is favorable both for the customer or operator. When an operator wants to change the OLT that uses a different protocol e.g. an upgrade of the U/S line rate, the ONTs are kept in place and no manual intervention is required from the operator or from the customer.

So, by connecting the ONT equipped with the described capability, consecutively with a first OLT and a second OLT that are using different protocols e.g. EPON and GPON at 1.24 Gb/s symmetrical, the ONT is capable, without manual intervention, to get ranged by both OLTs and become operational.

In order to further explain the working of the selector SEL three examples will be described in more details.

A first example is based on distinguishing marks of the BPON protocol. Hereby, it has to be explained that among the different PON standards, the BPON ones are described in the ITU Standard G Series with reference G.983: TELECOMMUNICATION STANDARDIZATION SECTOR OF ITU (10/98) SERIES G: TRANSMISSION SYSTEMS AND MEDIA, DIGITAL SYSTEMS AND NETWORKS: Digital transmission systems—Digital sections and digital line system—Optical line systems for local and access networks—Broadband optical access systems based on Passive Optical Networks (PON). More in detail in ITU-T Recommendation G.983.1 (Previously CCITT Recommendation) at page 33, paragraph 8.3.5.3.5 the Grants are described. Indeed, this paragraph describes that each PLOAM cell is filled with 27 grants. The substations for access on the upstream fiber use these grants. It has to be explained that for the 155 Mbit/s upstream cases, 53 grants per frame are needed. The 53 active grants are mapped in the first two PLOAM cells of the downstream frame. However, for the 622 Mbit/s upstream case, 212 grants per frame are needed. These 212 active grants are mapped into the first eight PLOAM cells of the downstream frame. The last grant of any even numbered PLOAM cell is filled with an idle grant. The grant fields of the remaining PLOAM cells for the asymmetrical case are all filled with idle grants and hence will not be used by the substation.

It has to be remarked here that the B-PON standard indicates that the idle grants, which are inserted by the OLT in the PLOAM cells of the downstream signal, are "not used" by the substation ONT3. However, the aim of this aspect of the present invention is that the available number of idle grants in a downstream frame is interpreted by the substation as an indication for the upstream line rate. Indeed, by counting in the substation, per downstream frame, this number of idle grants, the substation ONT3 can deduce which protocol with which upstream line rate the OLT expects to receive, hence which protocol with which upstream line rate the substation needs to use.

The selector SEL of the substation comprises a second determiner DET2 to recognize within the bit-stream BS one of the predefined patterns (PAT1, PAT2, PAT3, PAT4, . . . ).

Presume that the used references of FIG. 1 PAT1 and PAT2 has a value with a following meaning:

PAT1="Identification of a PLOAM cell structure of a BPON type of protocol"; and
PAT2="Start of frame indication in a PLOAM cell of a BPON type of protocol"; and
PAT3="Identification of an Idle Grant within a BPON-PLOAM cell structure".

The selector SEL as shown in FIG. 1 comprises the second determiner DET2 to recognize within the bit-stream BS one of the plurality of predefined patterns (PAT1; PAT2; PAT3; PAT4; . . . ).

A first implementation of such a second determiner DET2 is provided when the second determiner DET2 recognizes within the bit-stream the first pattern PAT1=Identification of a downstream PLOAM cell structure/header of a BPON type of protocol"". A further implementation of this second determiner DET is provided when the second determiner DET2 recognizes within the bit-stream the second Pattern PAT2=" (start of) Frame recognition. Still a further implementation of the second determiner DET2 is provided when the second determiner DET2 recognizes within the bit-stream the third pattern PAT3="Identification of the Idle Grants within the BPON-PLOAM cells within a frame".

In the event when in the bit-stream BS firstly the "Identification of a PLOAM cell structure of a BPON type of protocol" is recognized and hereby also the "Start of frame indication of a BPON type of protocol" is recognized, and hereafter also the "Identification of Idle Grants within the BPON-PLOAM cells of the DS frame" is recognized, the selector SEL determines that the type of protocol is a BPON type of protocol and selects within the available types of BPON protocol these with a matching downstream bit-rate. This pre-selection provides a pre-selected set of types of protocol. Presume that among the four available BPON protocols the ones with the downstream line-rate of 622 Mbit/sec are pre-selected i.e. TYP1 and TYP2.

Furthermore, the counter is included to count the number of idle grants within the identified downstream frame. Per each identified idle grant of the same frame, the counter CNT is increased by one. At the end of the frame the value of the counter is used in order to make a final selection among the pre-selected sets of types of protocol. Indeed, based upon the value of the counter, the number of idle grants is determined. Based upon the number of idle grants, and based upon the downstream line-rate the matching upstream line-rate is determined. Finally based upon this matching upstream-line rate, a final selection among the pre-selected types TYP1 and TYP2 is determined. Presume that the second one TYP2 is determined. The selected type of protocol TYP2 is provided by the selector SEL to the activator ACT to activate the selected type of protocol TYP2 for the operation of the optical network unit ONT3 and to thereby enable this substation ONT3 to communicate with the main station OLT in upstream direction according to the selected type of protocol TYP2.

So, when a substation is started up, and synchronization is achieved with the downstream signal, it synchronizes with the downstream frame and recognizes the PLOAM cells. If in a downstream frame, the number of non-idle grants is 53, it means the desired upstream line rate is 155 Mb/s and the respective type of protocol is selected, however, if in a downstream frame, the number of non-idle grants is 212, the desired upstream line rate is 622 Mb/s and another respective type of protocol is selected.

It has to be remarked that similar implementation to select a type of BPON protocol can be provided e.g. determining a match/no-match for an idle grant and per each identified non-idle grant of the same frame, increasing the counter CNT by one.

A second implementation of the working of the selector is based on distinguishing marks of the GPON standard. In order to recognize a GPON type protocol one of the patterns e.g. PAT4 is defined as the synchronization pattern of the GPON standard which is a 4 byte synchronization pattern. Once the substation is able to lock on this pattern the selector SEL executes an extra check upon the sequence with which this pattern PAT4 returns. When this substantially equalizes 125 microseconds, the selector SEL decides that the main station OLT imposes a GPON type of protocol.

A further selection is made by the selector SEL by further implementing the second determiner DET2 to recognize:

firstly one of the distinguishing marks as being a downstream GPON-PLOAM message format; and
secondly, and based upon a predefined message identification within the PLOAM message, an "Upstream-Overhead message"; and
furthermore the value represented by the two bits of octet 10 of the upstream overhead message can be used to determine, according to a pre-stored association between potential values of these two bits with predefined upstream-line-rate values in a memory of the substation, an upstream line-rate e.g. 622 Mbit/sec, which is the desired upstream line-rate for use by the substation towards the main station. Based upon this upstream line-rate the selector SEL makes a final selection among the set of GPON type protocols i.e. the one with the matching upstream line-rate. This selected type of protocol is, also in this example, provided by the selector SEL to the activator ACT to activate the selected type of protocol for the operation in order to thereby enable the substation to communicate with the main station according to the selected type of protocol.

A third implementation of the working of the selector SEL is based on the fact that the selecting step according to predefined rules and conditions being based upon one or more distinguishing marks of the predefined types of protocol, only uses the by the first determiner DET1 achieved knowledge of the downstream line-rat. Indeed, among the available types of protocol the Ethernet PON protocol is the only one that has a downstream line rate that is substantial equal to 1.25 Gigabit/s. When the first determiner DET1 provides the downstream line-rate value to the selector SEL the selecting step of the selector SEL comprises a first checking of this value upon a match with some predetermined and pre-stored downstream line-rate values at the ONT3. In the event when a matching with one of the pre-stored downstream line-rate values is available, and this value equals substantially 1.25 gigabit/s, the selector SEL decides according to its predefined rules and conditions that the desired type of protocol being imposed by the line terminator OLT is the Ethernet PON protocol TYP4. This type of protocol TYP4 is forwarded to the activator ACT to activate the selected type of protocol TYP4 for operation and communication with the optical line terminator OLT. It has to be remarked that together with the selection by the selector SEL of the type of protocol, also the to be used upstream line-rate for the ONT3 is determined.

It has to be remarked that the types of EPON protocol in future may be augmented with higher line rate option e.g. 10 Gb/s in downstream, and that an ONT may be equipped with the logic to also distinguish between these different possible line rates possibly defined for EPON.

It has to be remarked that actual known procedures such as a synchronization procedure of one or another known type of protocol can be re-used to implement part of the predefined rules and conditions being based upon distinguishing marks of the type of protocol. However, the required functionality of the final selection itself among the different types of protocol will have to be added.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A configuration method for use by a substation to be coupled to a main station in an optical access network, said configuration method comprising:
predefining for said substation a plurality of types of protocol;
after being coupled to said main station, determining by said substation a bit-rate and a line-coding for a bit-stream transmitted over said optical access network by said main station, thereby providing a downstream line-rate and a downstream line-coding; and
based upon at least one of said determined downstream line-rate and said determined downstream line-coding, selecting by said substation according to predefined rules and conditions a type of protocol out of said plurality of predefined types of protocol for said bit-stream; and
activating said selected type of protocol and thereby enabling said substation to communicate with said main station according to said selected type of protocol,
wherein the substation comprises an optical network terminator (ONT) of the optical access network and the main station comprises an optical line terminator (OLT) of the optical access network.

2. The configuration method of claim 1, wherein said selecting comprises recognizing within said bit-stream one of a plurality of predefined patterns.

3. The configuration method of claim 2, wherein said recognized predefined pattern is a Physical Layer Operation and Maintenance cell and said selecting further comprises counting a number of idle grants within said predefined pattern.

4. The configuration method of claim 1, wherein said selecting is based upon said detected downstream line-rate.

5. A substation for coupling to a main station in an optical access network and for executing a configuration method, said substation being enabled to operate according to at least one of a plurality of predefined types of protocol, said substation comprising:
a first determiner that determines, after being coupled to said main station, a bit-rate and a line-coding for a bit-stream transmitted over said optical access network by said main station, and that provides thereby a downstream line-rate and a downstream line-coding;
a selector that selects, based upon at least one of said determined downstream line-rate and said determined downstream line-coding, and according to predefined rules and conditions, a type of protocol out of said plurality of predefined types of protocol for said bit-stream; and
an activator that activates said selected type of protocol and thereby enables said substation to communicate with said main station according to said selected type of protocol,
wherein the substation comprises an optical network terminator (ONT) of the optical access network and the main station comprises an optical line terminator (OLT) of the optical access network.

6. The substation according to claim 5, wherein said selector comprises a second determiner that recognizes within said bit-stream one of a plurality of predefined patterns.

7. The substation according to claim 6, wherein said recognized predefined pattern is a Physical Layer Operation and Maintenance cell and said selector further comprises a counter being coupled to said second determiner to count a number of idle grants within said predefined pattern.

8. The substation according to claim 5, wherein said substation is further configured to form part of a passive optical network in a telecommunication system.

9. The configuration method of claim 1, wherein said plurality of predefined types of protocol comprises a BPON protocol, an EPON protocol, and a GPON protocol.

10. The substation according to claim 5, wherein said plurality of predefined types of protocol comprises a BPON protocol, an EPON protocol, and a GPON protocol.

11. A configuration method comprising:
coupling a substation to a main station in an optical access network;
predefining for said substation a plurality of types of protocol;
receiving a bit-stream transmitted over said optical access network by said main station;
determining by said substation a bit-rate and a line-coding for said bit-stream received from said main station;

selecting a type of protocol among said plurality of predefined types of protocol for said bit-stream based upon at least one of said determined bit-rate and said determined line-coding; and activating said selected type of protocol and communicating with said main station according to said selected type of protocol, wherein the substation comprises an optical network terminator (ONT) of the optical access network and the main station comprises an optical line terminator (OLT) of the optical access network.

12. The configuration method of claim 11, wherein said selected type of protocol is one of a BPON protocol, an EPON protocol, and a GPON protocol.

13. The configuration method of claim 1, wherein said ONT is coupled to a common branch of the optical access network and said OLT is coupled to the ONT through an individual branch among a plurality of branches of the common branch.

14. The substation according to claim 5, wherein said ONT is coupled to a common branch of the optical access network and said OLT is coupled to the ONT through an individual branch among a plurality of branches of the common branch.

15. The configuration method of claim 11, wherein said ONT is coupled to a common branch of the optical access network and said OLT is coupled to the ONT through an individual branch among a plurality of branches of the common branch.

* * * * *